(12) United States Patent
Caimi

(10) Patent No.: US 12,033,606 B2
(45) Date of Patent: Jul. 9, 2024

(54) REINFORCED SOUND-ABSORBING PANEL AND METHOD FOR THE PRODUCTION THEREOF

(71) Applicant: ELEDA S.R.L., Milan (IT)

(72) Inventor: Renato Caimi, Milan (IT)

(73) Assignee: ELEDA S.R.L., Milan (IT)

( * ) Notice: Subject to any disclaimer, the term of this patent is extended or adjusted under 35 U.S.C. 154(b) by 0 days.

(21) Appl. No.: 16/978,877

(22) PCT Filed: Mar. 7, 2019

(86) PCT No.: PCT/IB2019/051835
§ 371 (c)(1),
(2) Date: Sep. 8, 2020

(87) PCT Pub. No.: WO2019/171309
PCT Pub. Date: Sep. 12, 2019

(65) Prior Publication Data
US 2020/0410972 A1   Dec. 31, 2020

(30) Foreign Application Priority Data
Mar. 9, 2018 (IT) .................. 102018000003410

(51) Int. Cl.
*G10K 11/162* (2006.01)
*B29C 43/36* (2006.01)
(Continued)

(52) U.S. Cl.
CPC ............ *G10K 11/162* (2013.01); *B29C 43/36* (2013.01); *B32B 5/024* (2013.01); *B32B 5/26* (2013.01);
(Continued)

(58) Field of Classification Search
CPC .................. G10K 11/162; B29C 43/36; B29C 2043/3665; B32B 5/024; B32B 5/26;
(Continued)

(56) References Cited

U.S. PATENT DOCUMENTS 5,660,908 A * 8/1997 Kelman .................... B32B 3/26
    428/74
6,951,264 B2 * 10/2005 Byma ....................... B32B 3/26
    181/290

FOREIGN PATENT DOCUMENTS

| DE | 10 2010 037800 | 3/2012 |
| EP | 0 492 466 | 7/1992 |
| EP | 2 820 199 | 12/2018 |

OTHER PUBLICATIONS

International Search Report for PCT/IB2019/051835, dated Jul. 19, 2019, 3 pages.
(Continued)

*Primary Examiner* — Alicia J Weydemeyer
*Assistant Examiner* — Laura B Figg
(74) *Attorney, Agent, or Firm* — NIXON & VANDERHYE P.C.

(57) ABSTRACT

A sound-absorbing panel comprising a padding layer comprising heat-bonded synthetic fibers is described. The sound-absorbing panel has a first outer face and a second outer face which are spaced from each other so as to form a panel thickness between them. The sound-absorbing panel also comprises a channel within the panel thickness. The padding material between at least one of the outer faces of the panel and the channel has a density greater than the density of the padding material far from the channel so that the panel is more rigid in the region of said channel.

6 Claims, 14 Drawing Sheets

(51) Int. Cl.
*B29L 7/00* (2006.01)
*B32B 5/02* (2006.01)
*B32B 5/26* (2006.01)
*B32B 7/12* (2006.01)
*E04B 1/99* (2006.01)

(52) U.S. Cl.
CPC ................. *B32B 7/12* (2013.01); *E04B 1/99* (2013.01); *B29C 2043/3665* (2013.01); *B29K 2995/0002* (2013.01); *B29L 2007/002* (2013.01); *B32B 2262/0276* (2013.01); *B32B 2307/102* (2013.01); *B32B 2419/00* (2013.01); *E04B 2103/04* (2013.01)

(58) Field of Classification Search
CPC .............. B32B 7/12; B32B 2262/0276; B32B 2307/102; B32B 2419/00; E04B 1/99; E04B 2103/04; B29K 2995/0002; B29L 2007/002
See application file for complete search history.

(56) References Cited

OTHER PUBLICATIONS

Written Opinion of the ISA for PCT/IB2019/051835, dated Jul. 19, 2019, 5 pages.

\* cited by examiner

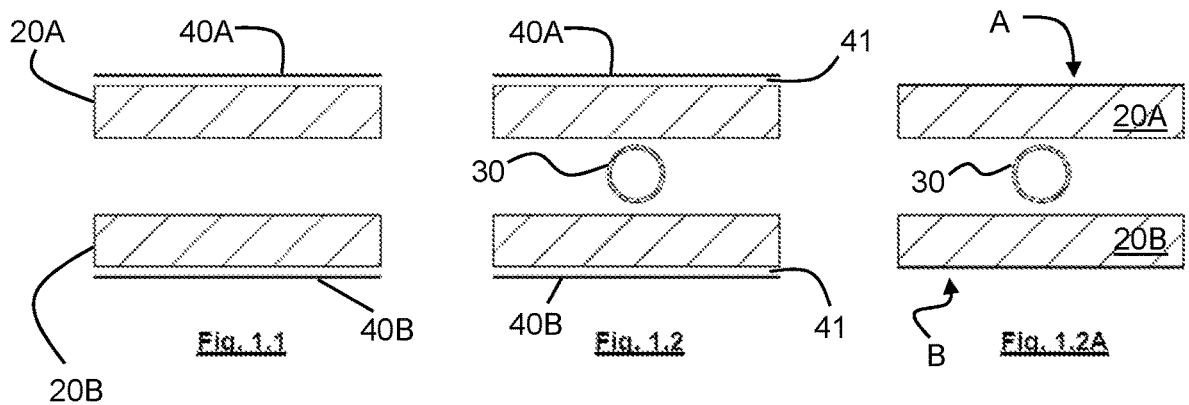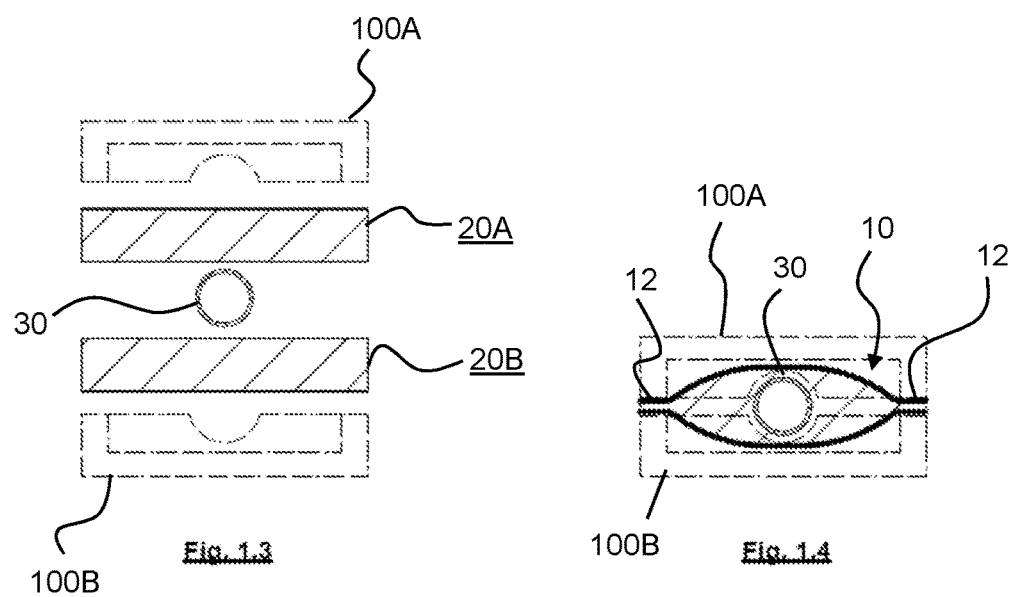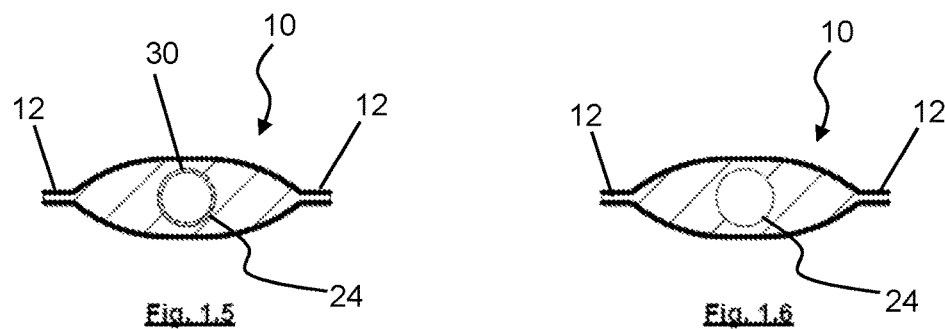

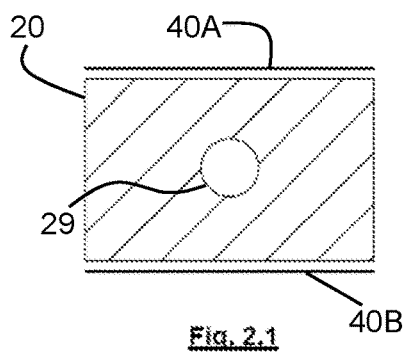
Fig. 2.1
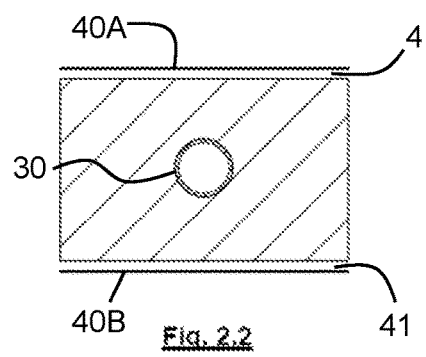
Fig. 2.2
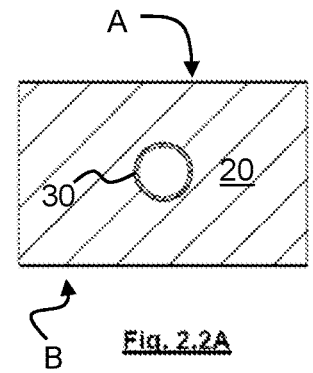
Fig. 2.2A
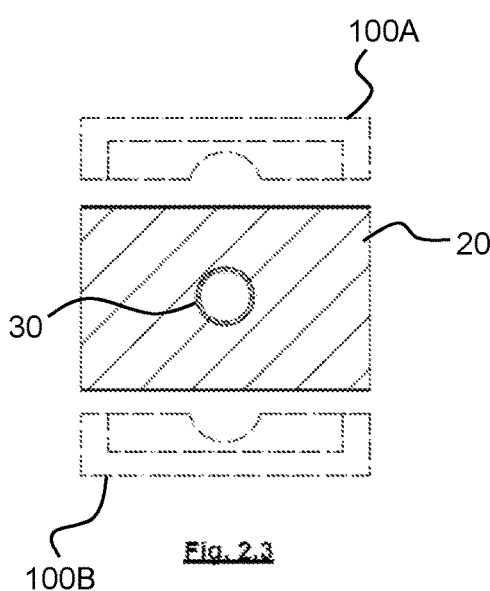
Fig. 2.3
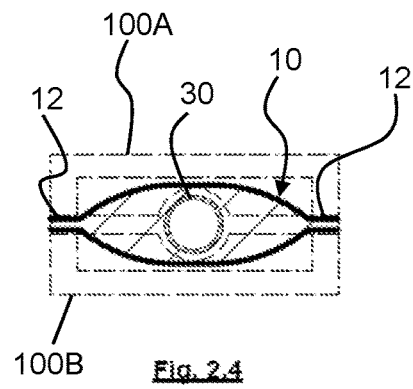
Fig. 2.4
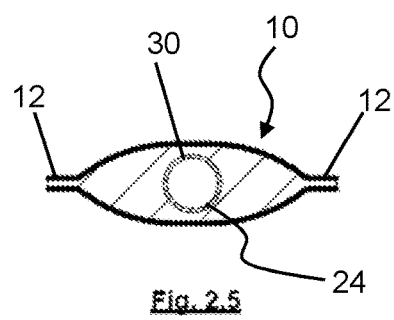
Fig. 2.5
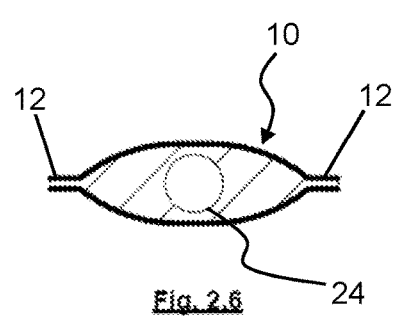
Fig. 2.6

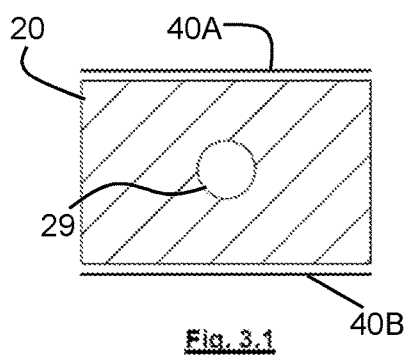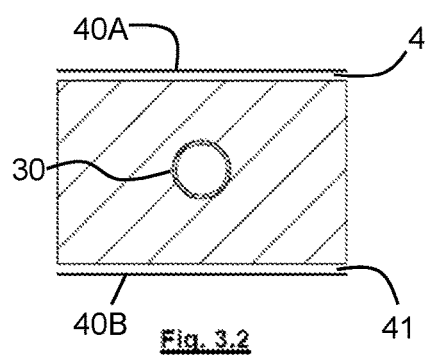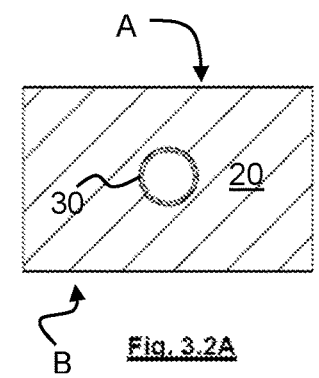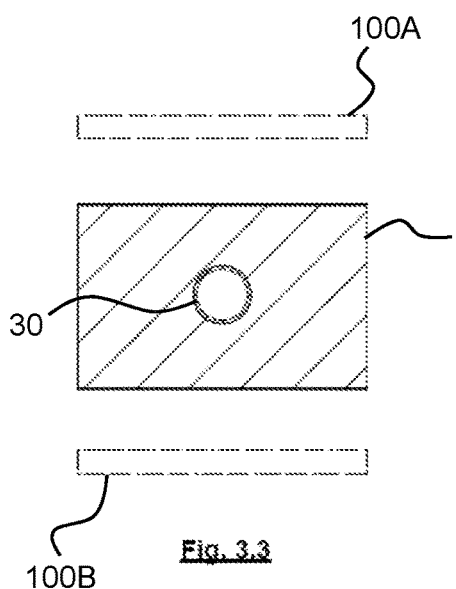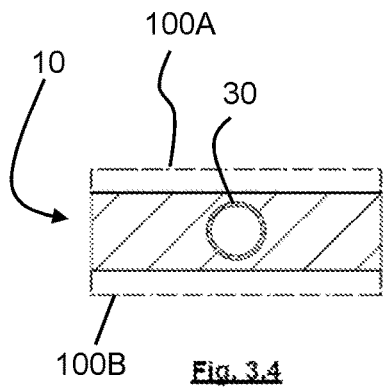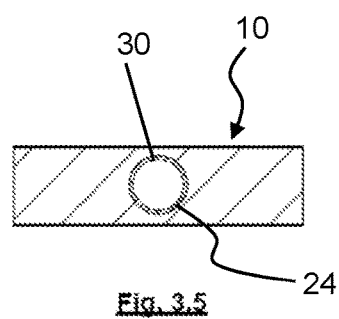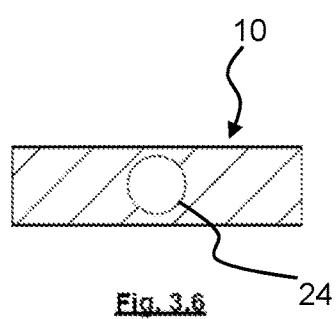

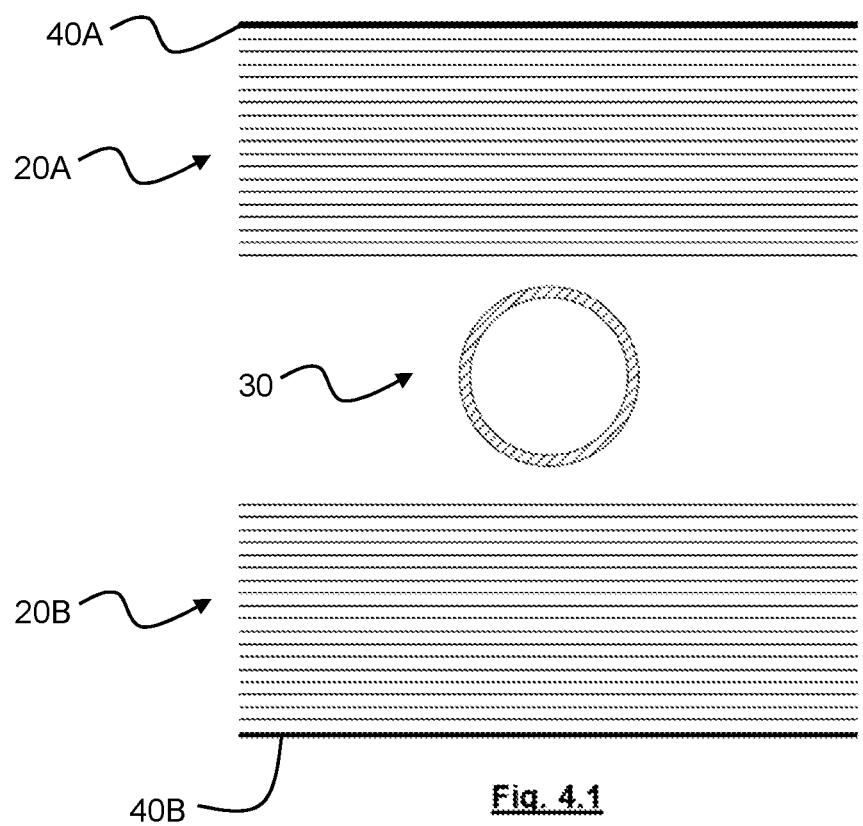
Fig. 4.1
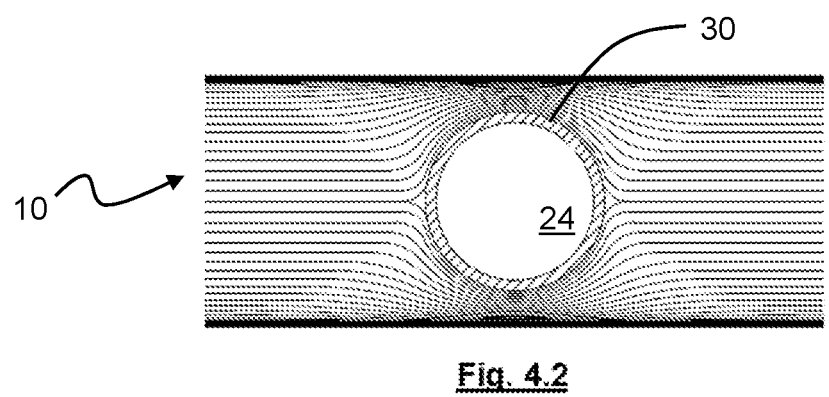
Fig. 4.2
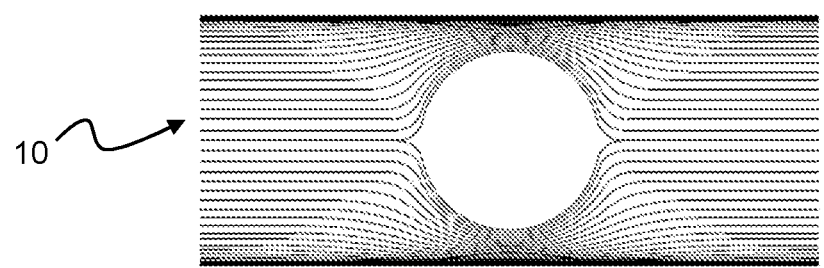
Fig. 4.3

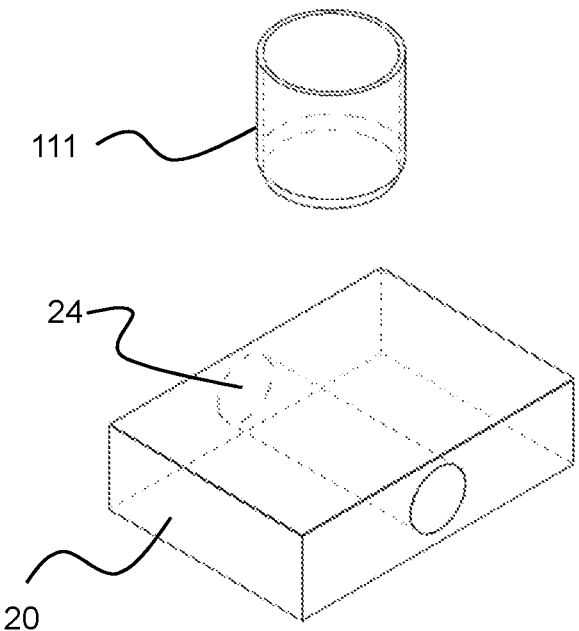
Fig. 12.1
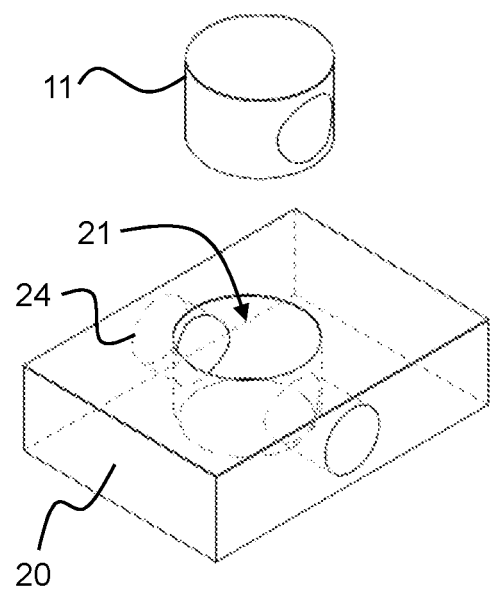
Fig. 12.2
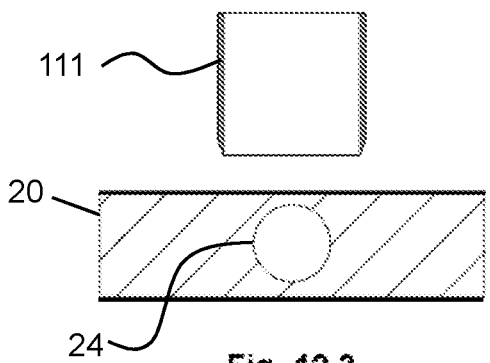
Fig. 12.3
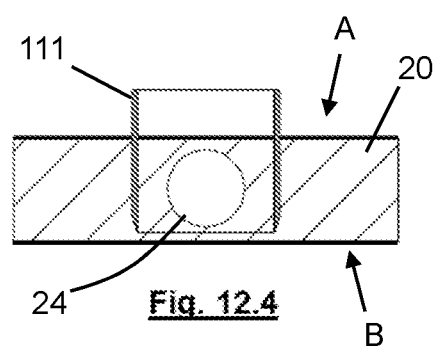
Fig. 12.4
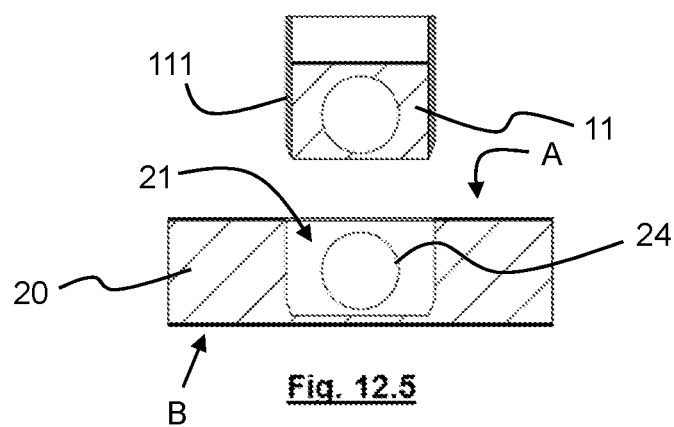
Fig. 12.5

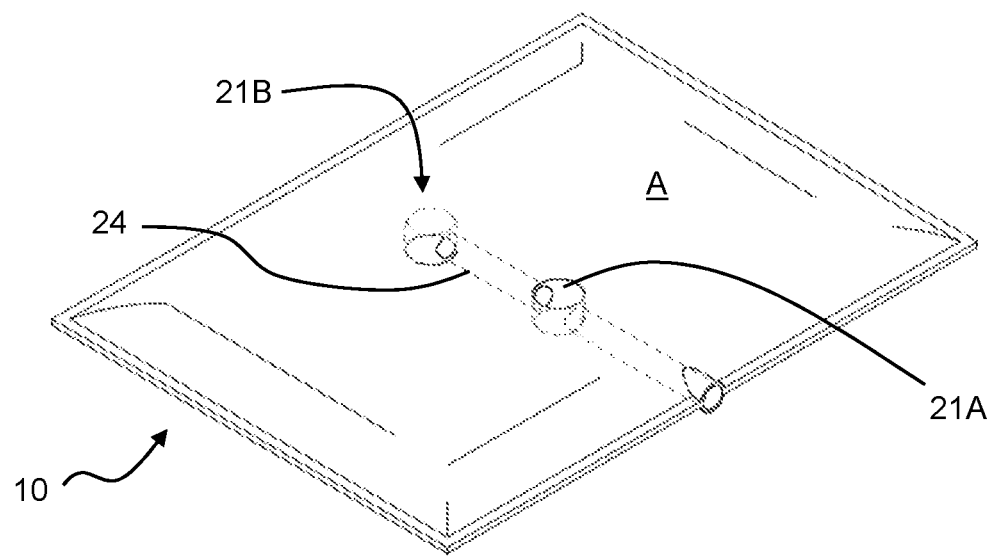
Fig. 13.1
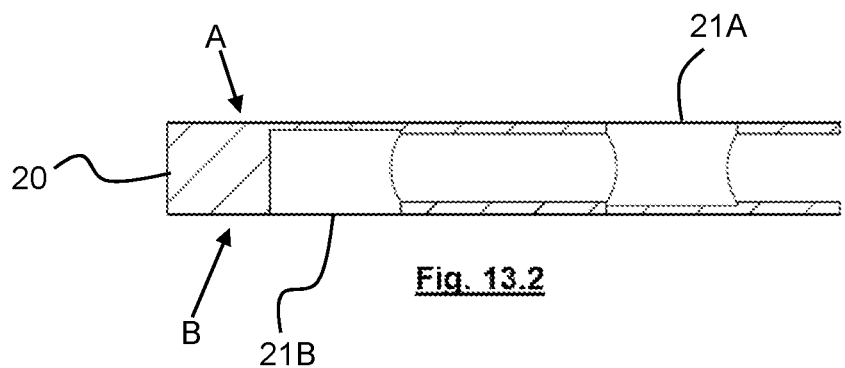
Fig. 13.2
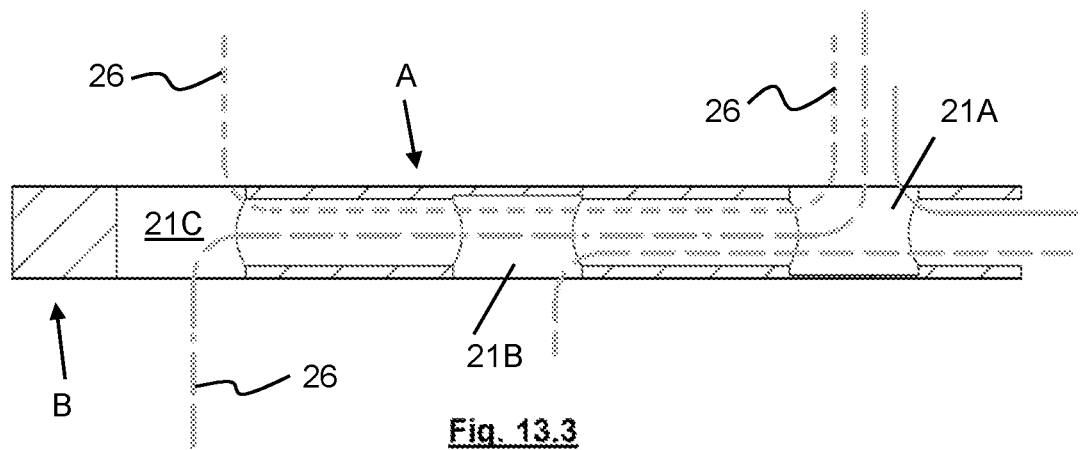
Fig. 13.3

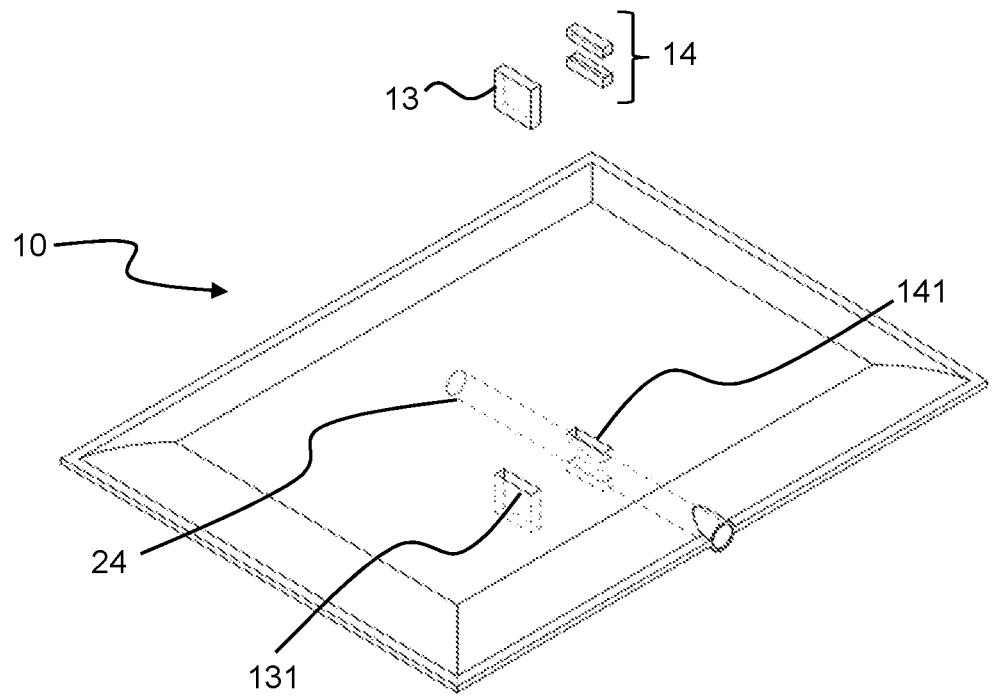
Fig. 15.1
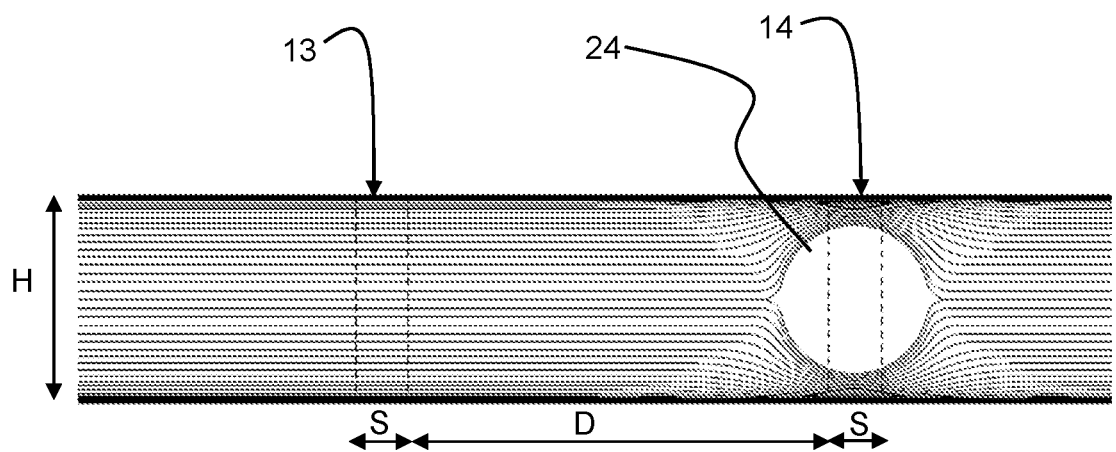
Fig. 15.2

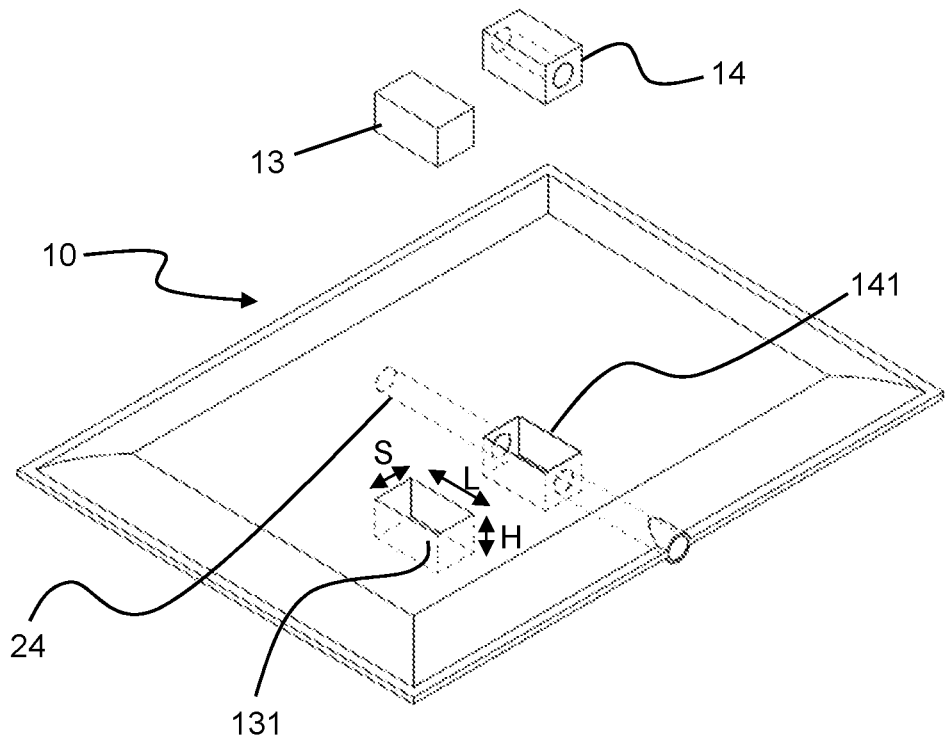
Fig. 16.1
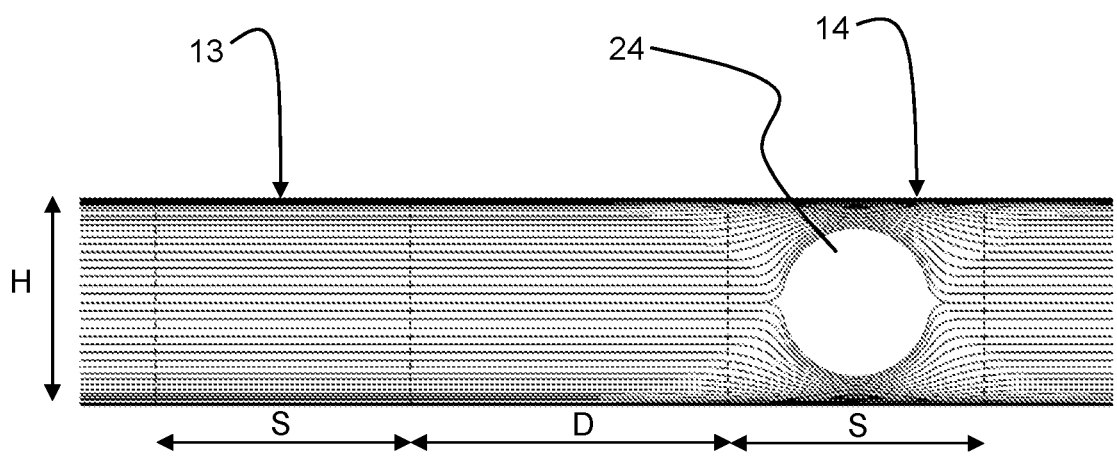
Fig. 16.2

REINFORCED SOUND-ABSORBING PANEL AND METHOD FOR THE PRODUCTION THEREOF

This application is the U.S. national phase of International Application No. PCT/IB2019/051835 filed 7 Mar. 2019, which designated the U.S. and claims priority to IT Patent Application No. 102018000003410 filed 9 Mar. 2018, the entire contents of each of which are hereby incorporated by reference.

FIELD OF APPLICATION

The present invention relates to a reinforced sound-absorbing panel and a method of producing such a reinforced sound-absorbing panel.

PRIOR ART

It is known that, when a sound wave emitted in a closed room encounters a surface, part of its energy passes through the surface, part is absorbed by the impact with the surface and part is reflected into the room.

If, in a room, there is a large reflective surface area, the room may be acoustically very disturbed since the sound waves produced inside it are amplified with an effect similar to that of an echo.

In order to improve the acoustics of a room, without structural modifications, it is known to provide in the room one or more sound-absorbing panels for absorbing a large part of the energy.

Sound-proofing materials have the property that they absorb at least a part of the acoustic energy and reduce the amount of reflected energy.

EP 2,820,199 in the name of the same Applicant describes a sound-absorbing panel and method for the production thereof.

The panel according to EP 2,820,199 is extremely functional and represented a significant improvement in the sector of sound-absorbing panels. In fact, it combines excellent acoustic characteristics with optimum handling properties and a surprising degree of versatility. The panel according to EP 2,820,199 is very light and does not require a support frame differently from the previously known panels.

SUMMARY OF THE INVENTION

The aim defined by the Applicant is that of further improving the panel known from EP 2,820,199. In particular, the main object of the Applicant is to provide a panel which maintains substantially all the characteristics of the known panel, in particular the sound-absorbing, handling and versatility characteristics, but which at the same time has an even greater rigidity than the known panels.

The technical problem according to the present invention is therefore that of providing a sound-absorbing panel which has a greater rigidity than the sound-absorbing panel known from EP 2,820,199.

The inventor has surprisingly discovered that the problem may be solved by providing zones inside the thickness of the panel where the density of the material is greater than in other zones of the panel. The greater density corresponds to a greater rigidity in those zones. The greater density is achieved by using a molding core which reduces the space available for the material. The molding core may be extracted so as to form a channel (blind channel or through-channel) which makes the panel even more versatile.

According to a first aspect, the present invention provides a sound-absorbing panel comprising a padding layer comprising heat-bonded synthetic fibers, the sound-absorbing panel comprising a first outer face (A) and a second outer face (B) spaced apart from each other so as to form a panel thickness between them, wherein said sound-absorbing panel further comprises a channel in said panel thickness and wherein the padding material between at least one of said outer faces of the panel and said channel has a density greater than the density of the padding material far from the channel so that the panel is more rigid in the region of said channel.

The channel may be a through-hole or a blind hole.

The channel may be at least partially occupied by a molding core.

The panel may also comprise a support member which is at least partially inserted in a removable manner in said channel. The support member may also be fixed.

According to embodiments, the sound-absorbing panel further has an edge with a reduced thickness along a part of the perimeter of the panel or along the entire perimeter of the panel.

According to embodiments, the panel is double-sided with a symmetrical cross-section.

According to another aspect, the present invention provides a method of producing a reinforced sound-absorbing panel, comprising:
providing a padding layer comprising heat-bonded synthetic fibers, the padding layer comprising a first outer face and a second outer face,
arranging a molding core between said outer faces,
forming said padding layer with the molding core so as to form a longitudinal channel in the thickness of the panel between the two outer faces,
wherein the forming step causes the padding material between at least one of said outer faces of the panel and said channel to have a density greater than the density of the padding material far from the channel. In this way, the panel is made more rigid in the region of and/or close to the channel.

According to embodiments, the step of extracting the molding core after forming is also provided.

The channel may be a blind hole or a through-hole.

Another step which could also be provided is that of removing material of the padding layer to obtain a transverse opening which connects the longitudinal channel with the exterior on at least one of the faces of the sound-absorbing panel.

The step of removing material may be a punching or drilling step performed by a cutting blade or laser beam.

The method could envisage the step of inserting a bar into the channel.

All the thickness are understood as being measured in a transverse direction with respect to the outer surface of the panel. All the measurements and the values are understood, unless otherwise indicated, as being preceded by the word "about".

The invention will emerge more clearly by reading the detailed description below provided by way of a non-limiting example, to be read with reference to the accompanying drawings.

BRIEF DESCRIPTION OF THE DRAWINGS

FIGS. 1.1-1.6 are schematic cross-sectional views of the main steps for producing a panel according to a first embodiment of the present invention and the panel thus obtained;

FIGS. 2.1-2.6 are schematic cross-sectional views of the main steps for producing a panel according to a second embodiment of the present invention and the panel thus obtained;

FIGS. 3.1-3.6 are schematic cross-sectional views of the main steps for producing a panel according to a third embodiment of the present invention and the panel thus obtained;

FIGS. 4.1-4.3 are schematic cross-sections which provide an idea of the greater density which is obtained with the forming process according to the present invention in the vicinity of the molding core;

FIG. 7 shows in schematic form a reinforced panel with a linear core not passing all the way through;

FIGS. 12-1-12.5 show in schematic form how to obtain a blind opening transverse to the hole of the molding core;

FIGS. 13.1 and 13.2 show in schematic form a panel according to the invention with two oppositely arranged blind openings;

FIG. 13.3 shows a cross-section through a panel with two oppositely arranged blind openings and a through-opening;

FIGS. 15.1, 15.2, 16.1 and 16.2 show a comparison of the density in the vicinity of the channel with the density far from the channel.

DETAILED DESCRIPTION

Figure 5:
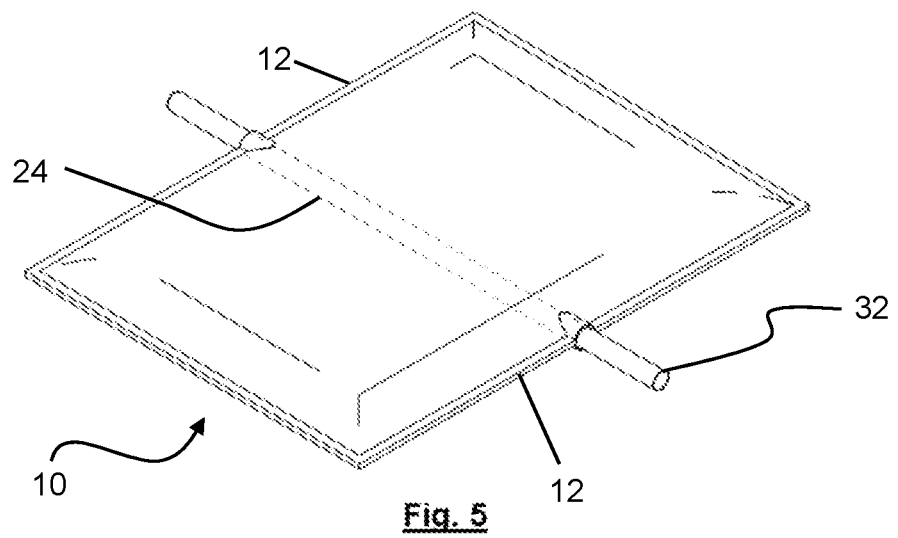
FIG. 5 shows in schematic form a reinforced panel with a linear through-core.

According to the present invention a method for producing a reinforced sound-absorbing panel and a reinforced sound-absorbing panel thus obtained are described. A sound-absorbing panel according to the present invention may be used on its own or in combination with other sound-absorbing panels to provide structures suitable for installation in various environments in order to improve the acoustics thereof. They may be used to make walls, partitions, ceilings, false ceilings or the like. They may also be used to make furniture or parts of furniture, such as seats, tables, sofas, bookshelves or the like.

The panel according to the present invention may have any shape. For example it may have a rectangular, square, round, regular polygon or irregular polygon shape.

According to the present invention and as will be described below a padding layer consisting of synthetic heat-bonded fibers is provided. Before forming, a molding core is provided within the thickness of the padding layer. During the forming step, the molding core is left in the thickness of the padding layer. After forming, the molding core may be removed or left in position. During forming, the material of the padding layer forms a more rigid layer around the molding core or at least around a part thereof. This more rigid layer substantially does not project from the thickness of the panel. Therefore, the reinforcement of the panel occurs without an increase in the weight, the dimensions and/or the shape.

With reference to FIGS. 1.1, 1.2, 1.2A, 1.3 and 1.4 the main steps of a method of producing a reinforced sound-absorbing panel 10 according to a first embodiment of the present invention will be described. FIG. 1.1 shows a schematic cross-sectional view relating to a first step of the method.

As shown in FIG. 1.1, according to the present invention a padding layer is provided. According to this first embodiment, the padding layer comprises a first padding layer 20A and a second padding layer 20B.

Preferably, the first padding layer 20A and the second padding layer 20B are made of the same material. According to alternative embodiments, each of the two padding layers is made of a material compatible with the other layer so that they may be joined together.

Preferably, the first padding layer 20A and the second padding layer 20B both comprise heat-bonded synthetic fibers.

In one embodiment, the heat-bonded synthetic fibers comprise polyester fibers.

The fibers of the padding layers 20A and 20B, before processing during the following steps, may have a density within the range of 10 Kg/m³ to 100 Kg/m³, for example between 30 Kg/m³ and 60 Kg/m³.

In a preferred embodiment of the invention, the fibers before processing have a density substantially equal to 44+/−5 Kg/m³.

The average density after processing is 68+/−10 Kg/m³.

Preferably, the fibers have a diameter of between 20 μm (micron) and 50 μm (micron), preferably a diameter of between 30 μm and 35 μm.

The fibers may be used in a temperature range of between −40° C. and +80° C.

Preferably, the fibers are non-toxic and non-irritants. Furthermore they may fully recyclable.

According to embodiments, the first padding layer 20A and the second padding layer 20B have the same thickness. According to alternative embodiments, they have different thicknesses.

According to the present invention, a molding core 30 is arranged between the two padding layers 20A and 20B. According to embodiments (not shown), the first padding layer and/or the second padding layer are shaped to form a cradle for housing the molding core 30 in a predetermined position.

According to preferred embodiments, a first layer of fabric 40A facing the outer face (A) of the first padding layer 20A is provided and/or a second layer of fabric 40B facing the outer face (B) of the second padding layer 20B is provided. The letters "A" and "B" may be used below and/or in the claims in order to indicate also the face of the panel with the fabric applied thereon.

Preferably, the layers of fabric 40A, 40B are also made of polyester.

For example, the fabric is formed by interweaving an elastic textured yarn with a yarn count of 750 dtex per warp and weft. The structure may be formed by 1600 yarns and 1500 wefts per meter with a crêpe weave. The weight per square meter may be 300 g. In one embodiment, the fabric is of the flame-retardant Trevira CS type.

According to the invention, the panel preferably comprises an adhesive layer 41 arranged between each padding layer 20A, 20B and each of the layers of fabric 40A, 40B.

In particular, the adhesive layer 41 may advantageously comprise a layer of glue, preferably applied by means of spreading. The layer of glue may be for example a low-melting polyester applied hot onto the fabric. The low-melting polyester may comprise powder, micro particles or a layer of fibers (arranged ordered or in a substantially random manner). The melting temperature is less than that of the padding material and may range between 60° C. and 120° C., preferably between 100° C. and 120° C.

Alternatively (FIG. 1.2), each padding layer 20A, 20B may be already provided with a layer of fabric 40A, 40B applied on one face thereof, namely on the outer face.

The molding core 30 may comprise a hollow or solid elongated body. Preferably it is a hollow elongated body.

The elongated body 30 of the molding core may be made of any material compatible with the manufacturing requirements and conditions of use, depending mainly on the overall weight of the panel and temperature reached during manufacture. Preferably, it is made of metallic material, such as aluminum or aluminum alloy. Advantageously, the surface of the molding core may be treated, for example with a polyethylene coating, in order to favor gripping of the molding core. Alternatively, it could be coated with a separating material in order to favor extraction of the molding core after the forming step.

The elongated body of the molding core 30 may have a cross-section which is circular, oval or elliptical or which has the form of an irregular or regular polygon (e.g. triangle, square, rectangle, trapezium, pentagon, hexagon, octagon, etc.). The elongated body of the molding core may also have a cross-section with a lobe-like form (e.g. figure-of-eight, three-leaf or four-leaf clover) or more generally with grooves and/or protuberances. The elongated body of the molding core may also have a cross-section in the form of a semi-circle or more generally corresponding to half (or in any case a part) of the aforementioned forms. In all of the figures a molding core with a hollow circular cross-section is shown. However, also depending on the cross-section of the panel, the molding core could also be asymmetrical, for example with a cross-section similar to the cross-section of a flattened bell.

The cross-section of the elongated body may be constant along its whole length or conical in order to facilitate extraction.

The elongated body may have a rectilinear longitudinal axis. Alternatively, the elongated body may have a non-rectilinear longitudinal axis, in the form of a "T" or "L" or cross-shaped, or could also form a grid.

The molding core 30 may be configured to remain inside the finished sound-absorbing panel 10 (typically when the longitudinal axis is not rectilinear). A section of a sound-absorbing panel 10 with core 30 incorporated is shown in the cross-sectional view of FIG. 1.5.

Alternatively, the molding core 30 may be configured so that it can be removed once the forming/molding step has been completed. Removal may be performed by simply extracting the molding core. In particular, the Applicant has established that an aluminum molding core may be easily extracted since there is very little or substantially zero adhesion of the material of the padding layer to the outer surface of the molding core. A section of a sound-absorbing panel 10 with core extracted after the forming step is shown in the cross-sectional view of FIG. 1.6.

Preferably the molding core 30 may be rigid or substantially rigid. Alternatively, it may be formed by an inflatable member. In this embodiment, the molding core may be deflated after the forming step so that it can be easily extracted. This solution offers the advantage that channels with irregular forms may be formed in the thickness of the panel.

With reference again to the illustrations in FIG. 1 and in particular to FIG. 1.3, according to the present invention, the two padding layers 20A and 20B (with the layers of fabric 40A, 40B, if provided) and the molding core 30 are sandwiched between two suitably shaped half-molds 100A 100B.

According to the present invention a heat-application step is provided in order to obtain a suitably shaped sound-absorbing panel 10, typically with a thickness less than that of the padding layer before the forming step.

The heat may be applied to the assembly comprising the padding layer (if necessary, with the layers of fabric) and the molding core. Alternatively, it may be applied (separately or simultaneously) only to the two padding layers 20A, 20B. Joining together of the two padding layers is obtained owing to the characteristics of the material or (instead or in addition) by means of a layer of adhesive arranged between the two padding layers.

According to the first embodiment, the finished sound-absorbing panel is shaped so as to have an edge 12 with a thickness smaller than the thickness of the padding layer in a central position of the panel.

The panel may have a rectangular shape or any other shape such as a square, circular, oval, elliptical, triangular, trapezoidal or other shape.

The panel 10, in a central position thereof, has a thickness, preferably of between 2 cm and 7 cm. In one embodiment, the thickness is about 3.7 cm.

According to another embodiment a sound-absorbing panel 10 which does not have a perimetral edge with a small thickness may be provided. This embodiment is shown in FIGS. 3.1 to 3.6. Since the process for obtaining the panel according to this embodiment is substantially the same as that described with reference to FIGS. 1.1 to 1.6, a detailed description thereof will not be repeated. The absence of the edge is substantially determined by the form of the two half-molds.

FIGS. 2.1 to 2.6 show instead a variant where the padding layer is not formed by two separate layers, but by a single layer 20. The layer 20 could be provided with a hole 29 for inserting the molding core 30.

According to another variant, the padding layer is formed by a first outer layer, by a second outer layer and by a third layer arranged between the two outer layers. Advantageously the outer layers and the inner layer could be different from each other or in any case have different densities (greater in the outer layers).

In the case of this embodiment also, since the process is entirely similar to that described in connection with FIG. 1, a detailed description thereof will not be repeated.

The panel 10 obtained by means of the process of the present invention has improved rigidity characteristics compared to the known panels in that, during the forming step, the material of the padding layer forms zones with a greater density in the vicinity of the molding core 30. FIGS. 4.1, 4.2 and 4.3 show in schematic form the concentration of the material in the vicinity of the molding core, with a consequent increase in rigidity. In particular, in the (smaller) space between the outer faces of the padding layer and the molding core, the material of the padding layer forms a layer with a rigidity greater than the rigidity in a zone of the panel far from the molding core and far from the edge 12 (if present). However, as a consequence of the greater rigidity of the panel, there is no increase in the overall weight of the panel because the amount of material used does not change. Moreover, the form of the panel 10 does not vary substantially. In fact, the reinforcement consists of an internal reinforcement, but does not result in any modification of the thickness of the panel 10. The only change in form may occur along the small-thickness edge 12 (if present) or in any case in the vicinity of the perimeter of the panel 10. In fact, slight swelling may occur in the vicinity of the perimeter of the panel, as shown in FIGS. 5, 6, 7 and 8.

More particularly, FIG. 4.1 shows the two padding layers 20A, 20B before the forming step. The distance between the parallel lines provides an indication of a certain initial density of the material, already mentioned above, before the forming step. After forming (FIG. 4.2 in the case where the molding core remains within the panel and FIG. 4.3 in the case where the molding core has been extracted) the thickness of the padding layer is less and the density is generally greater. The greater density is represented by means of the lines arranged closer together. In addition to the general increase in density, the increase in density of the material is particularly significant between the outer faces of the panel and the molding core and also along the flanks of the molding core. In these zones the material is more compact, making the panel more rigid.

Among others, FIG. 4.2, and FIG. 4.3 show that the channel 24 is completely encircled by the padding material of the padding layers 20A, 20B and that the channel 24 is arranged substantially in a middle of the panel thickness of panel 10 in a direction between the first face 40A and the second face 40A.

Therefore, the density of the padding layer in the space between the outer faces of the padding layer and the molding core 30 is greater than the density of the padding layer in a zone far from the molding core and not influenced by it. The variation in density depends on the distance (viewed in cross-section) between the outer face of the padding layer and the molding core 30. For example, the density between the molding core and one of the outer faces of the panel may be at least 1.1, 1.2, 1.3, 1.4, 1.5 or 2 times the density far from the molding core.

The density is greater also on the flanks of the molding core than the density far from the molding core. However, in these zones, the difference in density is not as great as between the molding core and the outer faces of the padding layer. Greater details as to the calculation of the density and the comparison between the density in a zone close to the molding core and far from it will be provided with reference to FIGS. 15 and 16.

The molding core 30 may be configured to be extracted after forming. In this way a channel 24, accessible from the outside of the panel 10, is left. The channel 24 is bounded longitudinally by a hardened high-density surface.

Alternatively, the molding core 30 may be configured to remain embedded in the material of the sound-absorbing panel and not extracted from it. In this case, the molding core 30, which remains embedded in the thickness of the padding, also contributes to the rigidity.

Either one of the two solutions offers advantages.

For example, if the molding core 30 is extracted, a more rigid sound-absorbing panel is obtained, without an increase in the weight of the panel. Moreover, still in the case of a panel with a core which is used for the forming step and then extracted, the sound-absorbing panel 10 retains the advantage of complete recyclability. In fact, the sound-absorbing panel according to the present invention may be 100% recycled. There is also the possibility, depending on the use intended for the panel, to insert a support member inside the channel of the molding core. For example, a rod, tube or cable may be inserted inside the channel (in a removable manner).

If the molding core 30 is left embedded in the material of the sound-absorbing panel, it increases the rigidity of the panel and this is a characteristic which is considered to be particularly advantageous in certain working conditions.

FIG. 5 shows, by way of example, a reinforced sound-absorbing panel according to the present invention. In this case, during molding, a through-channel 24 is created from one edge to the opposite edge. A bar 32 (for example a tube, extruded element or a round bar made of aluminum, steel or other material) may be inserted in order to support the sound-absorbing panel 10 and make it suitable for a particular application.

Figure 6:
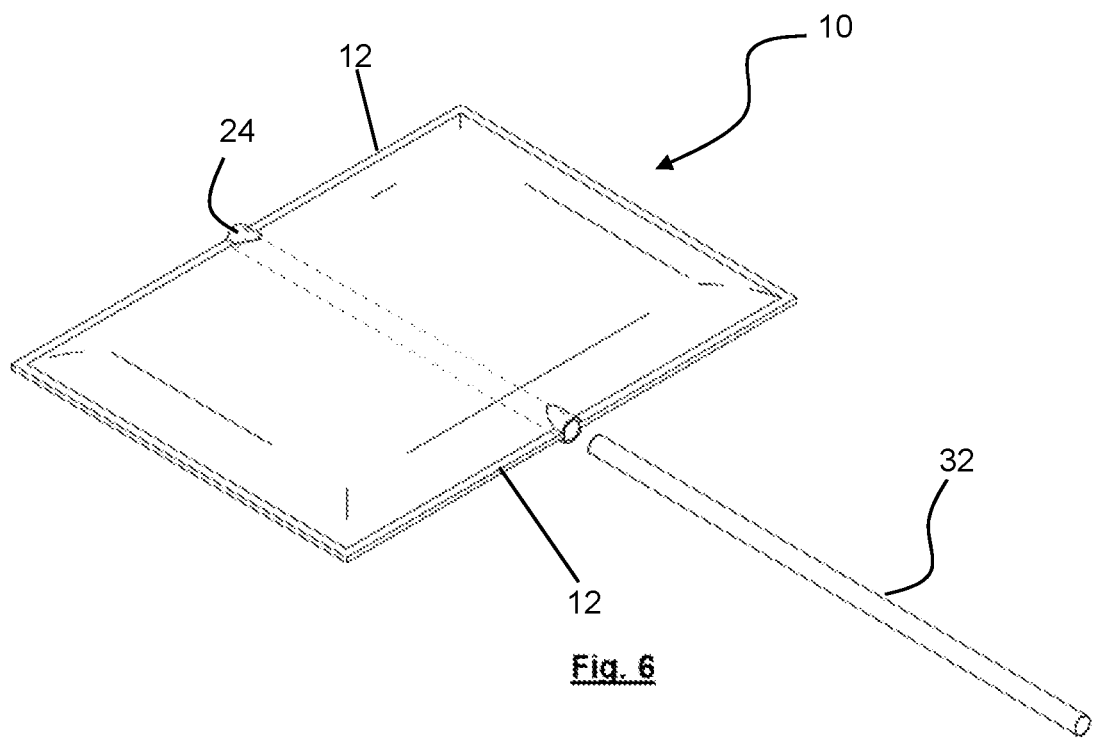
FIG. 6 shows in schematic form a reinforced panel with the linear through-core extracted.

As shown in FIG. 5, the sound-absorbing panel 10 retains substantially the form of a non-reinforced sound-absorbing panel, except for the two entry/exit points of the bar 32. In FIG. 6, the same panel is shown with the bar 32 extracted. The possibility of extracting the bar 32 is particularly advantageous for transportation, storage and recycling.

Figure 7:
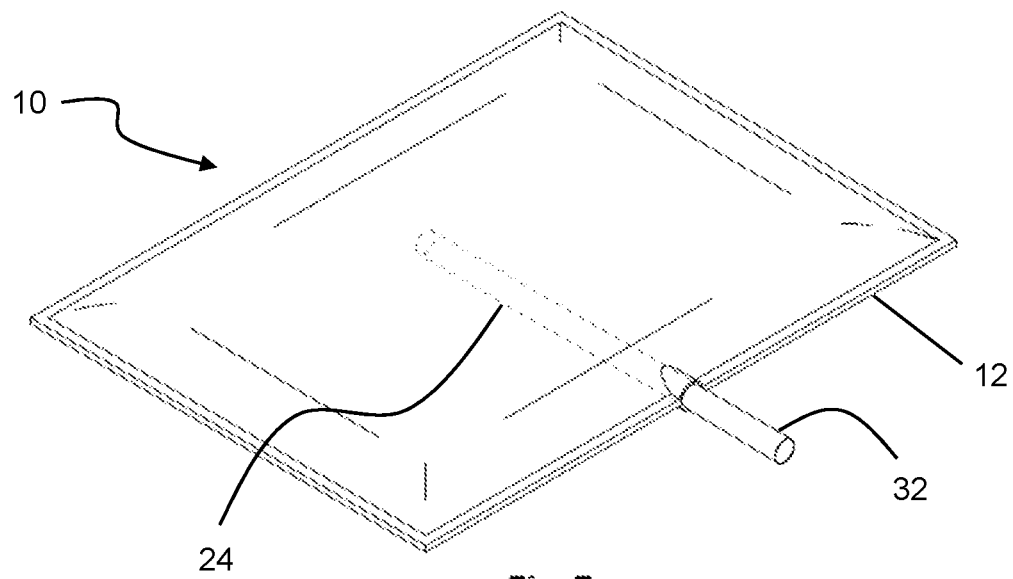
Figure 8:
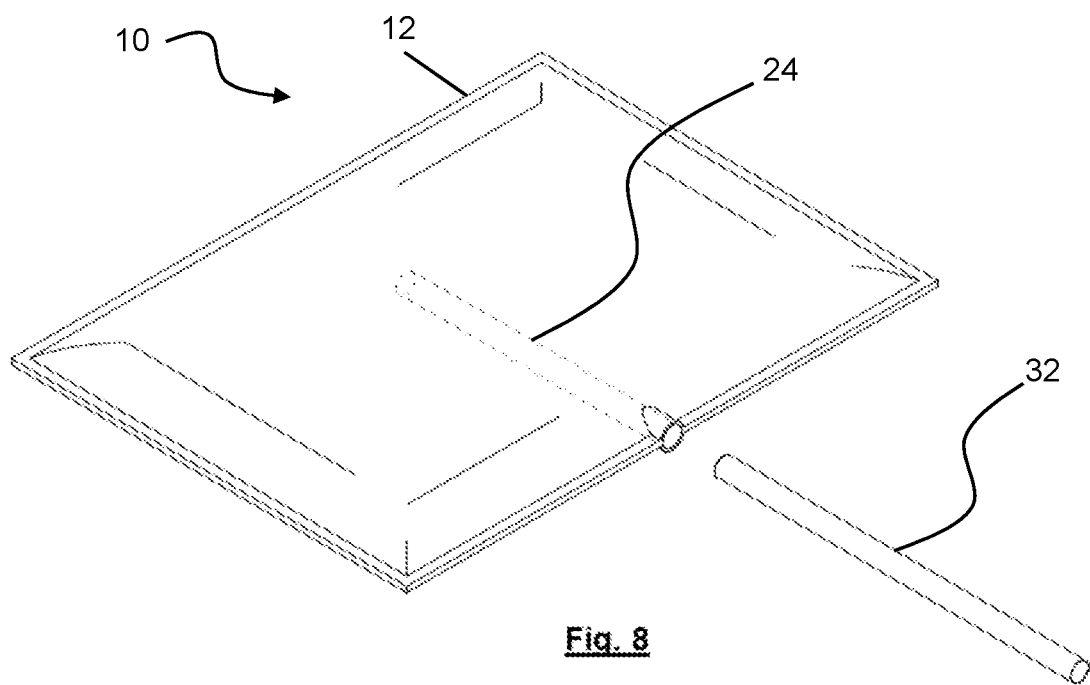
FIG. 8 shows in schematic form a reinforced panel with a linear core not passing all the way through, in the extracted condition.

FIG. 7 shows a reinforced sound-absorbing panel 10 according to the present invention in which the molding core 30 has been inserted so as not pass all the way through, differently from the embodiment shown in FIG. 5. Thus, the channel 24 inside the thickness of the panel 10 is blind and does not pass the whole way through. In this case also, a support bar 32 or the like may be inserted and extracted. FIG. 8 shows the panel with the core extracted from the thickness of the said panel. A sound-absorbing panel 10 in which the molding core 30 is inserted so as not to pass the whole way through may, for example, be advantageously used as a partition element for a desk.

Figure 9:
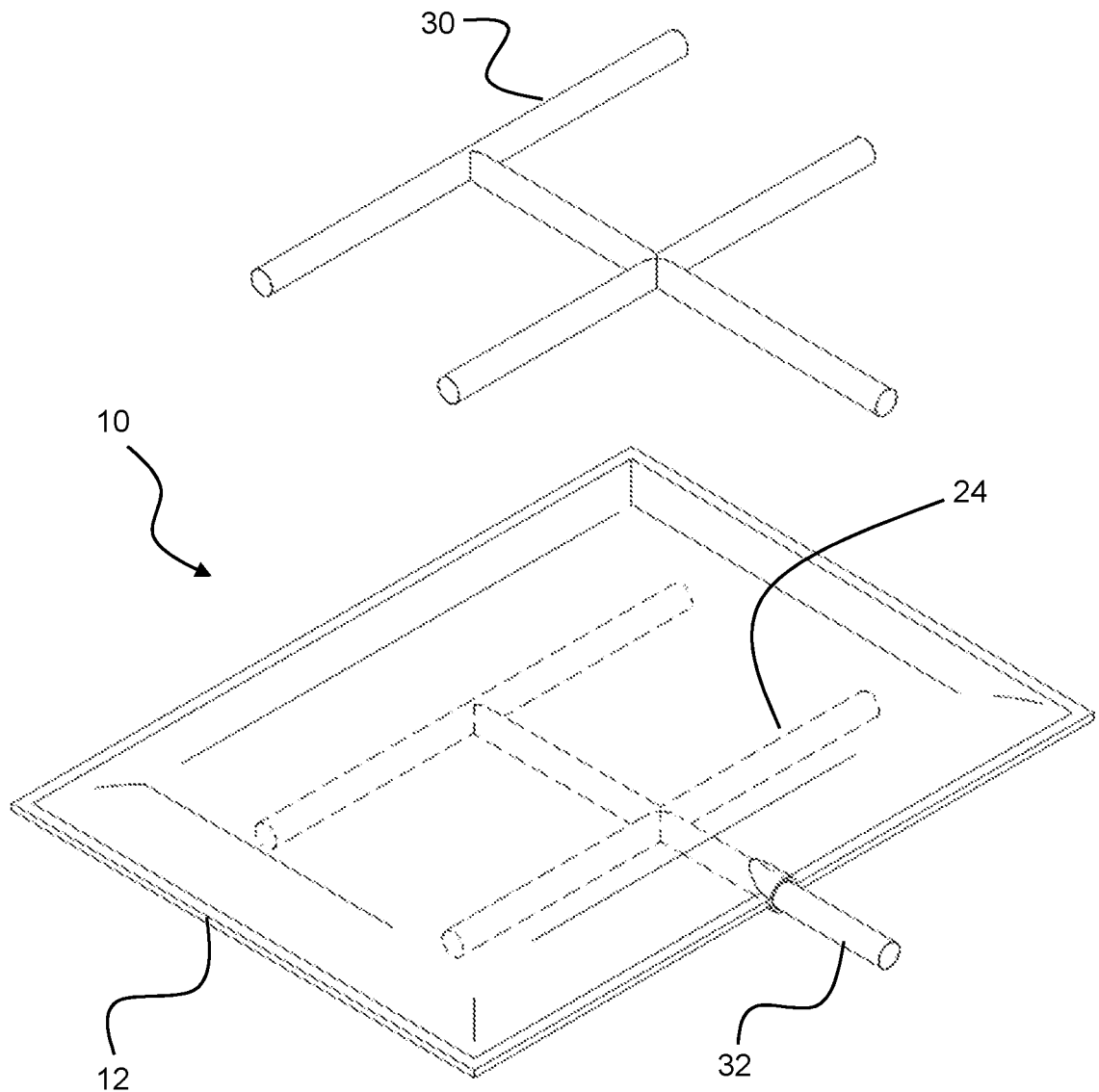
FIG. 9 shows in schematic form a reinforced panel with a non-linear core.

FIG. 9 shows in schematic form a sound-absorbing panel 10 according to the present invention with a non-linear molding core 30. For example the molding core is formed by a number of straight sections which form a framework. Obviously, such a form of the molding core 30 means that it cannot be extracted at the end of forming or that at least it cannot be fully extracted. In any case it is possible to provide an entry point for a support bar 32 or the like.

Figure 10:
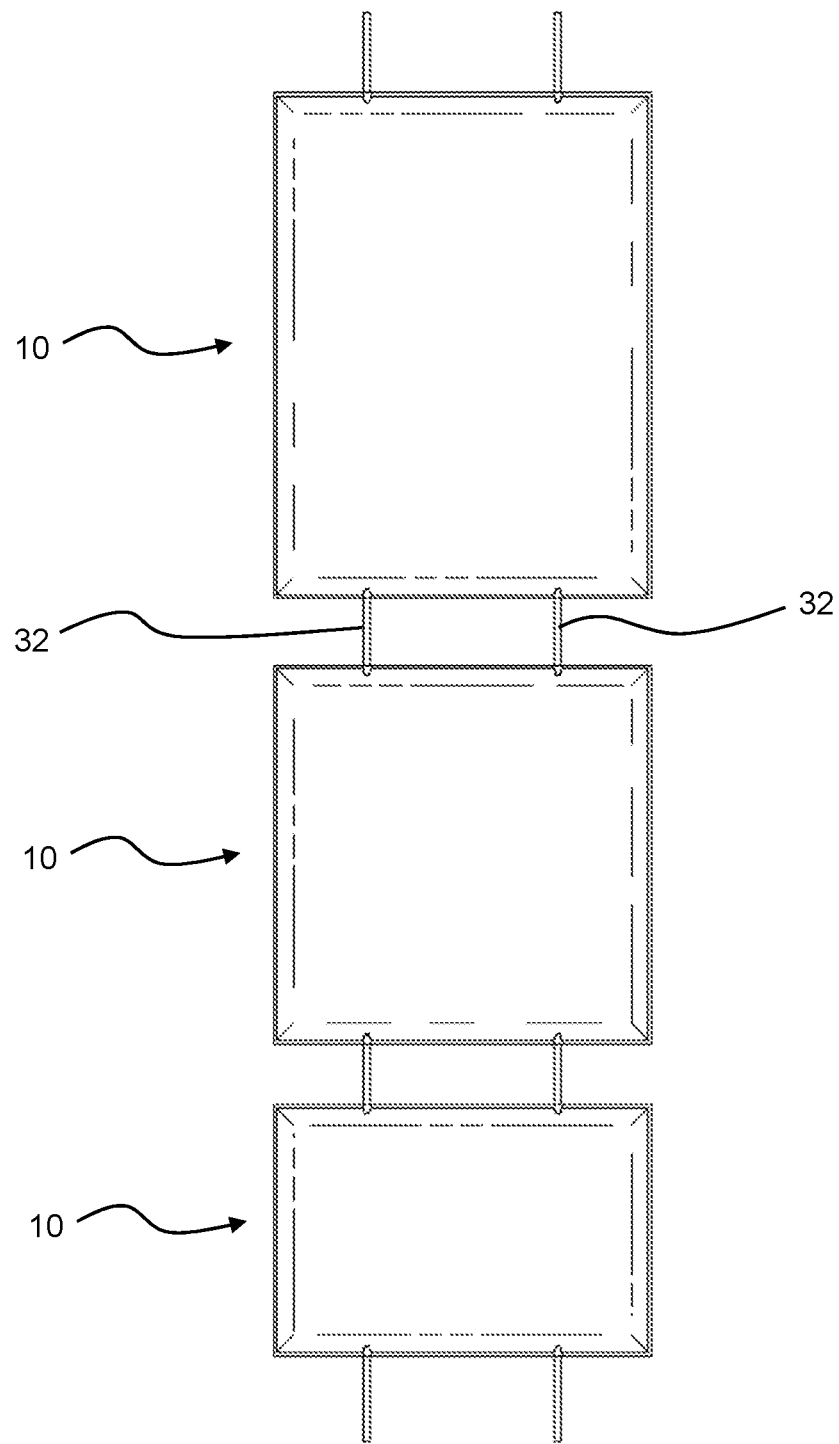
FIGS. 10 and 11 show two possible compositions of panels according to embodiments of the present invention.
Figure 11:
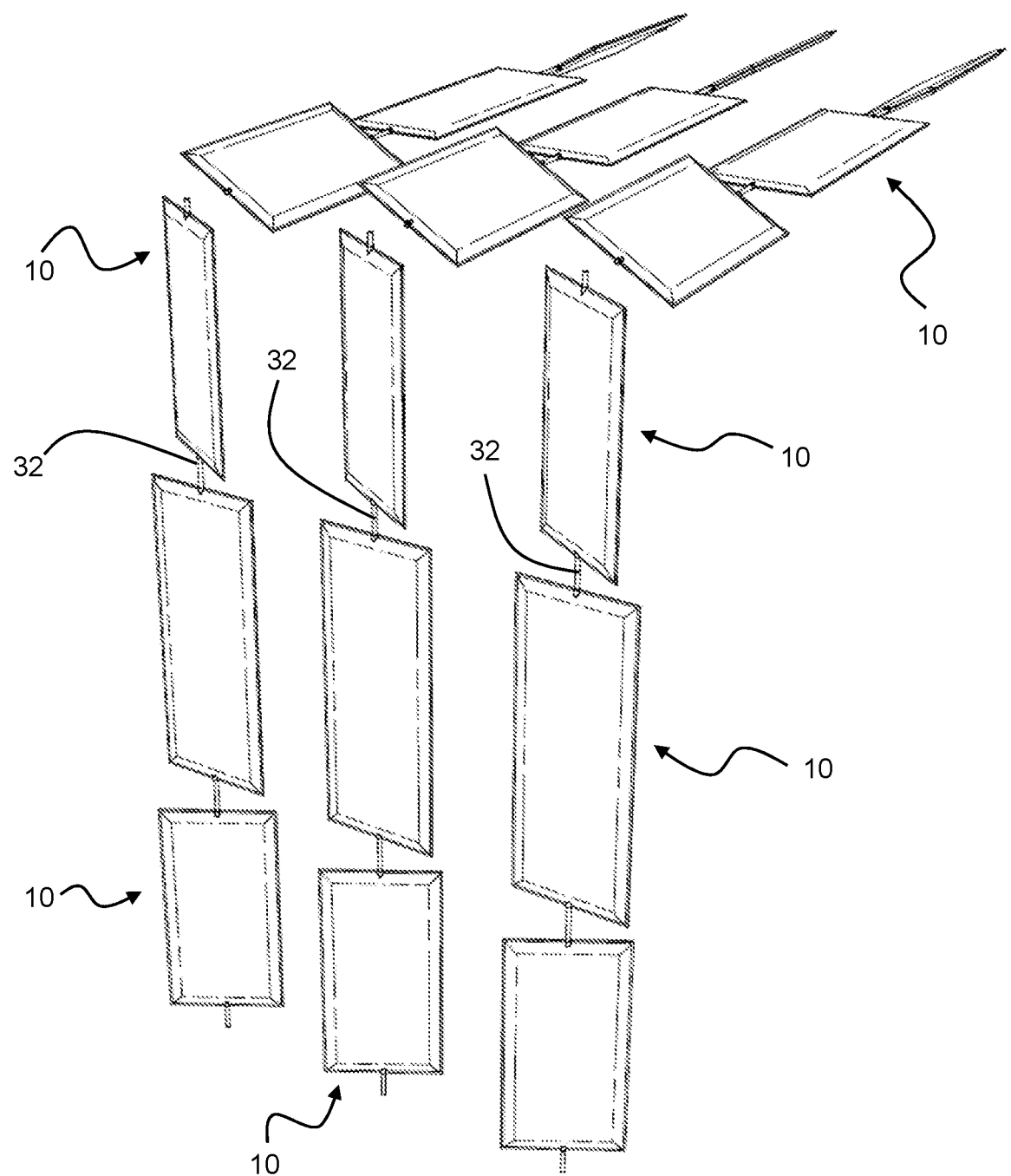

Merely by way of example, FIGS. 10 and 11 show two applications of a plurality of panels 10 according to the present invention. In a first case three panels 10 are joined together using two parallel bars 32 inserted inside through-channels of the panels. In FIG. 11 the panels are associated using a single central through-bar 32. Advantageously the panels may be suitably oriented.

A sound-absorbing panel 10 according to the invention may be joined to a bar in any known manner. Advantageously, an adhesive or also a mechanical system such as a screw inserted in the panel, transversely with respect to the bar 32, may be used.

By means of the channel 24 formed with the molding core 30 an electric cable, an optical cable or, more generally, a data cable may be mounted in the panel 10. In this way it is possible to associate with a sound-absorbing panel 10 a lighting body, a sensor, a sound diffuser, a microphone, a TV camera, a projector, a socket (for power or signals, e.g. USB socket or the like) or an actuator. The channel 24 may also be used to carry a tube with a fluid, for example a cooling or heating fluid.

FIGS. 12.1 to 12.5 show in a very schematic form further processing steps which may be useful for increasing the possibilities for using the reinforced panel 10 according to the present invention. In particular, these steps allow further advantageous use of the channel(s) 24 formed by means of the molding core(s) 30.

According to embodiments of the present invention a step for punching or removing material by means of rotating blades (or using another method, for example a laser beam) may be performed in order to allow access to the channel(s) 24 also from a central position of the panel, from one of the two outer surfaces or from both the surfaces. In particular, FIGS. 12.1 and 12.3 show in schematic form a tool 111 (blade or laser punching or cutting tool) before it has penetrated into the thickness of the panel 10 perpendicularly with respect to the surface of the panel 10. FIG. 12.4 shows in schematic form the tool 111 at the end of its travel inside the thickness of the panel. FIGS. 12.2 and 12.5 show in schematic form a plug 11 extracted from the panel. At the end of the material removal operation a hole 21 is formed transversely with respect to the surface of the panel 10, said hole connecting the longitudinal channel 24 formed by the molding core 30 with the outside.

Advantageously, the material of the panel 10 allows a plug 11 having the length of the transverse hole 21 to be extracted. In other words, the tool 111 may be inserted to the desired depth and the plug 11 (with a length corresponding to the depth to which the tool 111 is pushed) is separated from the rest of the panel 10 with very little or no effort.

The hole 21 obtained by means of the tool 111 may be a blind hole (as shown in FIG. 12) or a through-hole. The hole 21 is a blind hole when it does not pass through both the faces of the panel 10. Obviously, the transverse hole 21 may have any shape and not just a circular shape. For example, it may be square or rectangular so that it is able to seat (even only partially) a monitor, a tablet, a loudspeaker or the like.

FIG. 13.1 shows in schematic form a panel with two blind transverse holes 21A, 21B; one of the two holes (21A) opens out on one side (face) of the panel, while the other hole (21B) opens out on the opposite side (face) of the panel. FIG. 13.2 shows a cross-section of part of the panel shown in FIG. 13.1. FIG. 13.3 shows a cross-section of another panel (not shown) with two oppositely arranged blind transverse holes (21A and 21B) and a transverse through-hole (21C). In this figure, the path of cables or tubes is indicated by way of example by means of broken lines 26. These cables (or tubes) pass through the longitudinal channel and then, depending on the requirements, emerge from the openings of the blind holes (21A, 21B) or the through-hole (21C).

Figure 14:
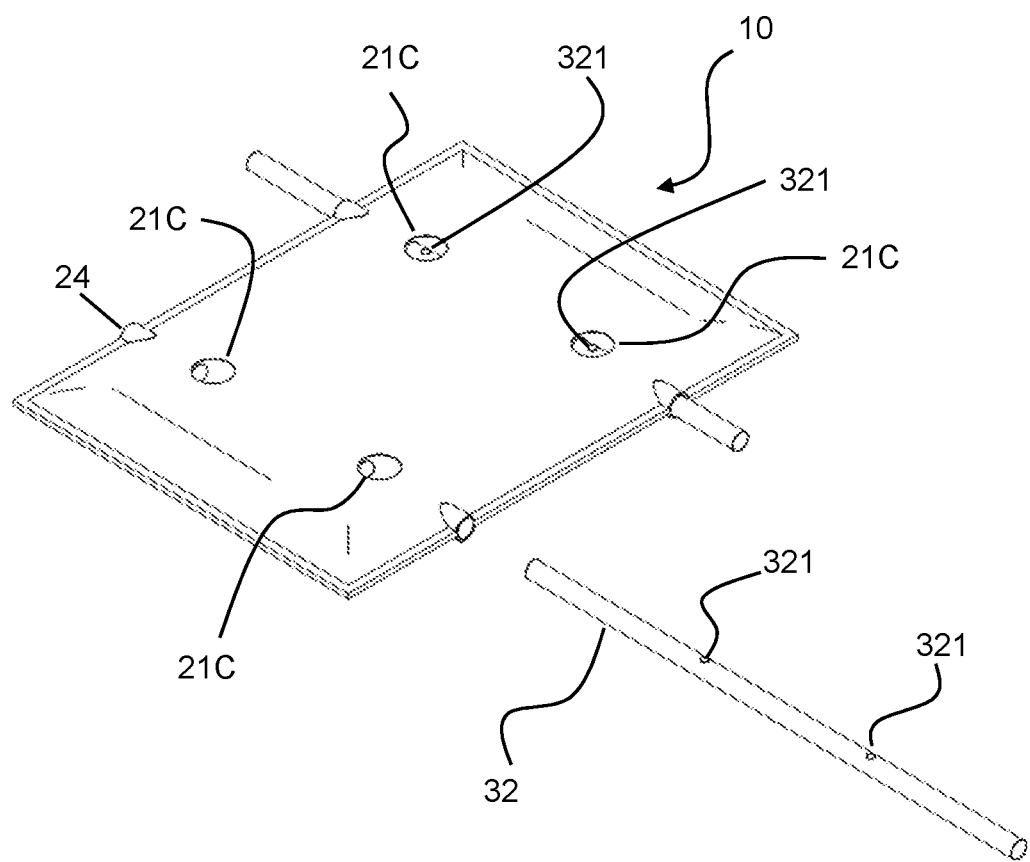
FIG. 14 shows a panel with four transverse openings.

FIG. 14 shows a sound-absorbing panel 10 according to the present invention with two parallel longitudinal through-channels 24 obtained by means of respective molding cores. Both the longitudinal channels 24 are designed to receive a bar 32. One of the longitudinal channels is shown without a bar 32 (i.e. with the bar extracted). Two transverse through-openings 21C are shown for each longitudinal channel. As shown in FIG. 14, the bar 32 is in turn provided with two transverse holes 321. The two holes 321 have an interaxial distance equal to the interaxial distance of the openings 21C and are oriented in the same manner. In this way, when the bars 32 are inserted inside the channels 24, the holes 321 are situated opposite the transverse through-openings 21 in the panel and may be both aligned with the axis of the openings 21C. The holes 321 constitute connection points which may be accessed through the openings 21C, allowing assembly with any systems for performing suspension from or fixing to walls or other structures.

After the forming step, the panel 10 according to the present invention has a greater density in the vicinity of the molding core and the channel formed by it. For the purposes of the present invention, the term "density" is understood as meaning the ratio between mass and volume. For a calculation of the density of the panel 10, FIGS. 15.1, 15.2, 16.1 and 16.2 may be referred to. A first sample 13 of material with a height H, length L and width S is considered. The height H is the height of the panel (viewed in cross-section) after the forming step. The length L is of the order of a few centimeters, for example 2, 3, 4 or 5 cm. The length L could also be greater than 5 cm. The width S could be a few millimeters, for example 5, 10 or 15 mm. The sample 13 is extracted at a certain distance from the area where the molding core is situated. Typically this distance D may be a few centimeters, for example 3, 4 or 5 cm or more. For example it may be 10 cm. The sample 13, must be taken at a sufficient distance not only from the molding core, but also from the edge 12 or from any rigid zones (for example depressions in the material).

A second sample 14 with the same dimensions H, L, S as the sample 13 is considered for calculation of the density in the vicinity of or in the region of the molding core. Preferably, the samples 13 and 14 are oriented in the same manner. For example, the sample 13 is taken along the longitudinal axis of the channel 24. In FIGS. 15.1 and 16.1 the reference numbers 131 and 141 have been used to indicate the holes present after extraction of the samples 13 and 14, respectively. Preferably, the mass of the samples 13 and 4 does not include the mass of the fabric, if present.

According to the present invention, $$\rho_{13} = m_{13}/v_{13} \qquad [1]$$

$$\rho_{14} = m_{14}/v_{14} \text{ and} \qquad [2]$$

$$\rho_{13} < \rho_{14}. \qquad [3]$$

wherein $\rho_{13}$ is the calculated density of the sample 13 (ratio between mass m of the sample 13 and volume v thereof) and $\rho_{14}$ is the calculated density of the sample 14 (ratio between mass m of the sample 14 and volume v thereof).

The volume of the second sample 14 may be defined by the sum of the volumes of two separate parts, as shown in FIG. 15.1, if the sample has a width smaller than the width of the channel 24. Alternatively, the second sample 14 may consist of a single piece, as shown in FIG. 16.1.

The invention claimed is:

1. A sound-absorbing panel comprising:
 a padding layer comprising padding material, the padding material comprising heat-bonded synthetic fibers,
 a first outer face and a second outer face spaced apart from each other so as to form a panel thickness in a first direction between them,
 a channel arranged substantially in a middle of the panel thickness in the first direction,
 wherein in the first direction the padding material between both (1) the first outer face of the panel and the channel the (2) second outer face of the panel and the channel has a density greater than the density of the padding material in a zone distanced from the channel in a second direction which is perpendicular to the first direction,
 wherein the channel is completely encircled by the padding material,
 wherein said channel is a through-hole, and
 wherein the channel is arranged substantially in a middle of the panel thickness, in the first direction.

2. A sound-absorbing panel comprising:
 a first outer face and a second outer face spaced apart from each other so as to form a panel thickness in a first direction between them,
 a channel arranged substantially in a middle of said panel thickness in the first direction;

a padding material comprising heat-bonded synthetic fibers provided between the first outer face and said channel and between the second outer face of the panel and said channel, wherein the channel is completely encircled by the padding material, wherein in the first direction the padding material between both (1) the first outer face of the panel and the channel, and (2) the second outer face of the panel and the channel has a density greater than the density of the padding material in a zone distanced from the channel in a second direction which is perpendicular to the first direction, and wherein said channel is at least partially occupied by a molding core.

3. A sound-absorbing panel comprising:

a first outer face and a second outer face spaced apart from each other so as to form a panel thickness in a first direction between them, a channel arranged substantially in a middle of said panel thickness in the first direction, a padding material comprising heat-bonded synthetic fibers provided between the first outer face and said channel and between the second outer face of the panel and said channel, wherein the channel is completely encircled by the padding material, wherein in the first direction the padding material provided between both (1) the first outer face of the panel and the channel and (2) the second outer face of the panel and the channel has a density greater than the density of the padding material in a zone distanced from the channel in a second direction which is perpendicular to the first direction, and a support member which is at least partially inserted in a removable manner in said channel.

4. The sound-absorbing panel of claim 1, further comprising an edge of reduced thickness along the entire perimeter of the panel.

5. The sound-absorbing panel of claim 4, wherein said panel is double-sided with a symmetrical cross-section.

6. The sound-absorbing panel of claim 1, wherein the channel is enclosed between a first layer of the padding material and a second layer of the padding material.

\* \* \* \* \*